United States Patent [19]

Matzek

[11] 3,715,463

[45] Feb. 6, 1973

[54] TRACKING CONTROL CIRCUITS USING A COMMON POTENTIOMETER

[75] Inventor: Lester Tucker Matzek, Lombard, Ill.

[73] Assignee: Warwick Electronics Inc.

[22] Filed: March 18, 1971

[21] Appl. No.: 125,564

[52] U.S. Cl. ............................................178/5.4 MC

[51] Int. Cl. ............................................H04n 9/12

[58] Field of Search........178/5.4 R, 5.4 MC, 7.3 DC, 178/7.5 DC, 7.3 R, 7.5 R

[56] References Cited

UNITED STATES PATENTS 3,374,310 3/1968 Beers ................................178/5.4 R

*Primary Examiner*—Robert L. Richardson
*Attorney*—Hofgren, Wegner, Allen, Stellman & McCord

[57] ABSTRACT

Simultaneously tracking chroma and contrast controls in a color television receiver use a common potentiometer having a wiper connected to a source of reference potential. One end of the potentiometer resistor is AC coupled to a luminance amplifier, and the other end is directly coupled to a DC bias circuit for a chroma amplifier. As the wiper is adjusted, the contrast of the luminance signal and the chroma level change in corresponding directions.

9 Claims, 1 Drawing Figure

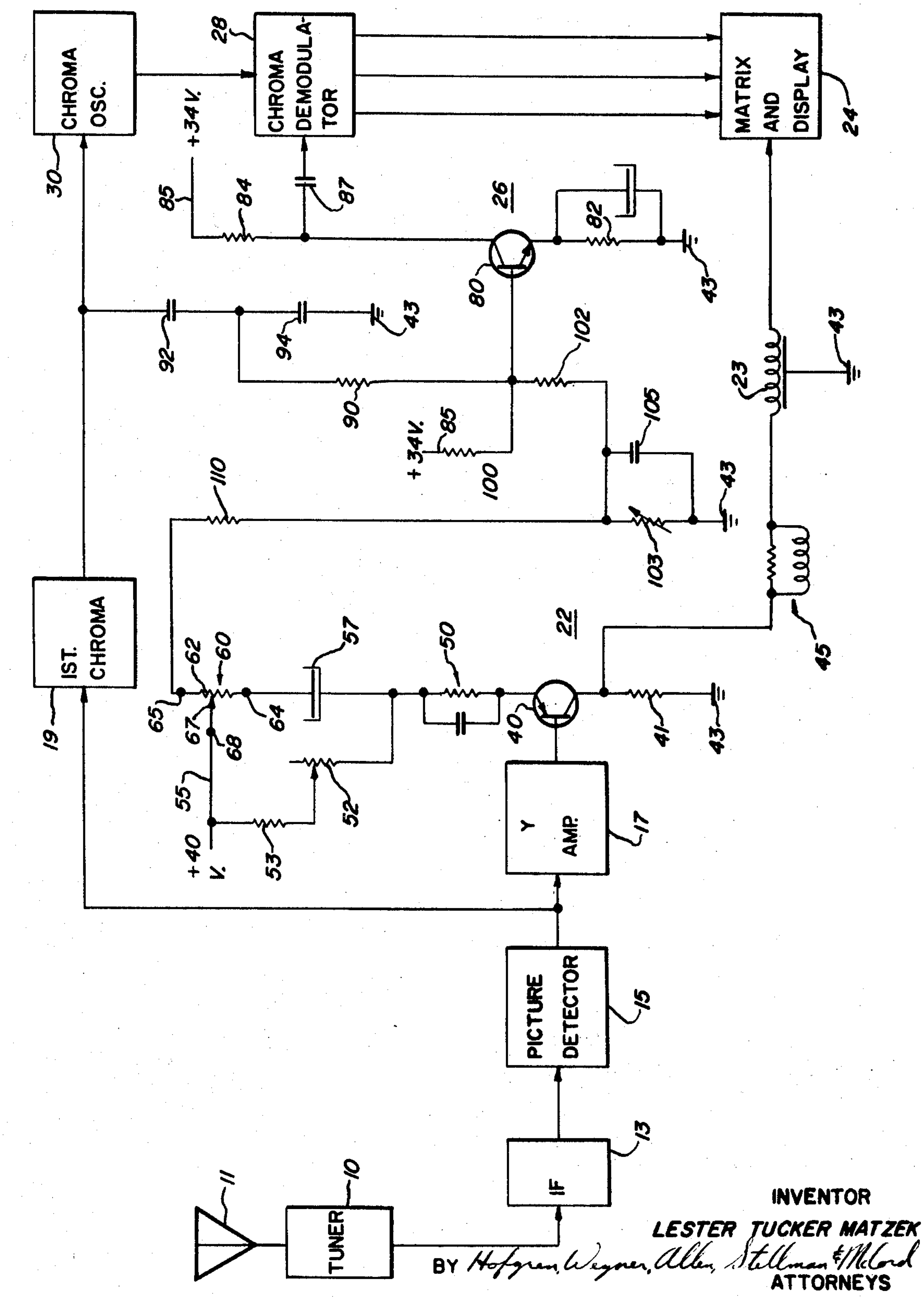
INVENTOR
LESTER TUCKER MATZEK
BY Hofgren, Wegner, Allen, Stellman & McCord
ATTORNEYS

TRACKING CONTROL CIRCUITS USING A COMMON POTENTIOMETER

This invention relates to plural adjustable control circuits in a television receiver, and more particularly to tracking control circuits using a common potentiometer.

Certain adjustable control circuits are interactive in nature, and when one control circuit is adjusted, a corresponding change must be made in the other control circuit. For example, in a color television receiver, adjustment of the contrast control setting for the luminance amplifier requires a directly proportional adjustment in the gain of the chroma amplifier in order that the chroma level will follow the luminance level. Typically, this is accomplished by ganging two potentiometers so that one potentiometer controls the AC gain of the luminance amplifier and the other potentiometer develops a DC control voltage for controlling the gain of the chroma amplifier. The potentiometer controlling the luminance amplifier is generally AC coupled to a reference potential source, as positive DC voltage or ground, so that the potentiometer functions as a rheostat or simple two-terminal variable resistor.

In accordance with the present invention, a uniquely simple circuit allows elimination of ganged potentiometers and the like by causing a single potentiometer to function as independent adjustment controls for both the luminance amplifier and the chroma amplifier. This is accomplished by using the previously unused end of the potentiometer otherwise used as a rheostat to develop a DC voltage inversely proportional to the contrast control setting. Preferably, the wiper of the single potentiometer is connected to a source of reference potential to separate the DC and video functions within the single potentiometer. This circuit can be used to simultaneously track or adjust, in either the same or opposite directions, other control circuits in a television receiver.

One object of this invention is the provision of an improved circuit which uses a single potentiometer to develop electrically independent but simultaneously tracking control signals for adjusting separate stages in a television receiver.

Another object of this invention is the provision of an improved simultaneous chroma and contrast control using a single potentiometer.

Other features and advantages of the invention will be apparent from the following description and from the drawing in which the single FIGURE is a partly block and partly schematic diagram of the invention as embodied in a color television receiver.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated.

Turning to the single FIGURE, a color television receiver includes a tuner 10 for converting a television signal received on an antenna 11 into a suitable intermediate frequency signal amplified by an IF stage 13. The IF signal is detected in a picture detector 15 and coupled to both a luminance or Y amplifier 17 and a first chroma amplifier 19. The luminance or Y signal is further amplified by a second luminance amplifier 22 and coupled via a delay line 23 to a matrix and display unit 24.

The amplified chroma signal from the first chroma amplifier 19 is coupled through a second chroma amplifier 26 to a chroma demodulator 28 which derives R–Y, B–Y and G–Y difference signals which are also coupled to matrix and display unit 24. The carrier for demodulation purposes is locally generated in a chroma oscillator 30 which is synchronized by the chroma signal from the first chroma amplifier 19.

The television receiver described above and illustrated in block form is of conventional nature, and certain other conventional circuits, such as synchronization, would be provided but have not been illustrated because they form no part of the present invention. The matrix and display unit 24 may take the form of a tricolor cathode ray tube in which the matrixing of the color signals from the chroma demodulator 28 and the luminance signal from the second luminance amplifier 22 occur within the cathode ray tube in order to develop a three color display. Alternatively, the matrixing may be externally accomplished by known matrixing networks in order to develop the three color signals which are coupled to a cathode ray tube.

Considering now the invention and related circuits, the second luminance amplifier 22 comprises a PNP transistor 40 having a collector coupled through a resistor 41 to a source of reference potential or ground 43. The collector is also coupled through a paralleled resistor-inductor network 45 to delay line 23 which connects with the matrix and display unit 24. The emitter of transistor 40 is coupled through a parallel resistor-capacitor network 50 to both a DC coupled path for controlling brightness and an AC coupled path for controlling contrast. The brightness adjustment is accomplished in a conventional nature by a potentiometer 52, connected as a rheostat, and a resistor 53 in series between potentiometer 52 and a source of reference potential or positive DC on a line 55, such as +40 volts DC. Potentiometer 52, it should be noted, is connected in a manner similar to many prior contrast controls, wherein the three terminal potentiometer is used as a two terminal rheostat, the third terminal either being connected to one of the used terminals or being unconnected, as is illustrated.

The adjustable contrast control includes a capacitor 57, as 30 microfarads, connected in series between network 50 and a single potentiometer 60 which serves as both the contrast control and the simultaneous tracking chroma control, as will appear. Potentiometer 60 includes a resistance element 62, as 1.2 kilohms, between a pair of end contacts or terminals 64 and 65, and a movable wiper 67 connected to a wiper contact or terminal 68 for movement across the fixed resistor 62. The wiper contact 68 is directly connected to the potential line 55, thereby clamping the wiper 67 to the potential of the DC line 55. Capacitor 57 AC couples the potentiometer 60 to the second luminance amplifier 22 in order that the position of the wiper 67 will control AC degeneration, and hence serves as a contrast control. The AC degeneration is determined by the amount of resistance between end contact 64 and wiper contact 68, and is independent of the resistance between wiper contact 68 and end contact 65.

The second chroma amplifier 26 consists of a NPN transistor 80 having an emitter coupled through a parallel resistor-capacitor network 82 to ground 43. The collector is connected through a resistor 84 to a source of reference potential, herein positive DC voltage available on a line 85, as +34 volts DC. The collector is also coupled through a capacitor 87 to the chroma demodulator 28. For driving transistor 80, the base is coupled through a resistor 90 to the junction between a pair of capacitors 92 and 94 connected between the output of the first chroma amplifier 19 and ground 43. Capacitors 92 and 94 form a capacitive voltage divider for coupling a desired amount of the chroma signal to transistor 80.

Forward gain control for transistor 80 is established by a biasing network including a resistor 100, a resistor 102, and a variable resistor 103 connected in series between the positive DC line 85 and ground 43. The junction between resistors 100 and 102 is coupled to the base of transistor 80. Variable resistor 103 forms a chroma control for the second chroma amplifier 26, allowing operator adjustment of the level of the chroma signal in a conventional manner. A capacitor 105, as 0.1 microfarads, shunts the variable chroma resistor 103 in order to bypass 3.58 megahertz signals to ground 43.

To cause the second chroma amplifier 26 to track with changes in gain of the second luminance amplifier 22, the junction between variable resistor 103 and resistor 102 is coupled through a resistor 110 to the end contact 65 of potentiometer 60. An additional biasing path for the second chroma amplifier is now formed from DC potential line 55, via wiper 67 and the portion of resistor 62 between the wiper 67 and end contact 65, resistor 110, and resistor 102 to the base of transistor 80.

In operation, potentiometer 60 develops a DC control voltage across the potentiometer resistance between wiper 67 and end contact 65 which controls the forward gain of the second chroma amplifier 26, in direct proportion to the AC gain of the second luminance amplifier 22. As wiper 67 is moved toward end contact 64, the amount of AC degeneration for second luminance amplifier 22 is decreased, increasing the contrast by increasing the AC gain of transistor 40. At the same time, the resistance between wiper 67 and end contact 65 is increased, decreasing the DC control voltage coupled to the base of transistor 80. Since transistor 80 is operated with forward gain control, the decreased DC bias increases the gain of the second chroma amplifier 26, thus causing the chroma signal to track the luminance signal.

Since wiper 67 is DC coupled to a source of reference potential, the DC and video functions are completely separated within the single potentiometer 60. While the reference potential has been illustrated as a DC supply potential, any reference source is suitable for this purpose. For example, wiper 67 and line 55 could be connected to ground 43. This change would require that transistor 40 be replaced with an NPN type transistor, the polarity of capacitor 57 be reversed, and collector load resistor 41 be connected to a B+ potential, such as +40 volts, rather than ground 43. Since the DC voltage to transistor 80 would vary in an opposite direction, reverse gain control would be used for the second chroma amplifier, rather than forward gain control as in the illustrated example, in order to cause the second chroma amplifier 26 to track in the proper direction. Other changes which can be made in the circuit will be apparent to those skilled in the art.

I claim:

1. In a television receiver including first signal translating means for developing a first signal having an adjustable level and second signal translating means for developing a second signal having an adjustable level, circuit means for causing the adjustable levels to track, comprising:

a potentiometer having a wiper contact movable across a resistance element connected between a pair of end contacts;

a source of reference potential;

means DC coupling one of said contacts to said reference potential source;

first tracking means connecting another of said contacts to said first signal translating means for varying the level of said first signal in response to movement of said wiper; and second tracking means connecting the remaining of said contacts to said second signal translating means for varying the level of said second signal in response to movement of said wiper.

2. The circuit means of claim 1 wherein said reference potential source is common to both said first and second signal translating means and the adjustable levels of said first and second signals both vary with respect to said reference potential, said DC coupling means connecting said wiper contact to said reference potential source to electrically separate said resistance element into two portions.

3. The circuit means of claim 2 wherein said first and second signal translating means each comprise transistor amplifiers which are to track in corresponding directions, bias means for biasing one of said transistor amplifiers in its forward gain control region.

4. The circuit means of claim 3 wherein the AC level of the other of said transistor amplifiers is to be varied, and the tracking means of said other transistor amplifier includes a capacitor in series between the potentiometer contact and said transistor amplifier to cause said potentiometer to vary the AC degeneration of said other transistor amplifier.

5. The circuit means of claim 1 wherein the AC level of said first signal is to be varied and the DC level of said second signal is to be varied, said first tracking means includes a capacitor in series between said another contact and said first signal translating means to cause the portion of said resistance element between said another contact and said wiper to control the AC impedance of said first tracking means.

6. In a color television receiver including a luminance amplifying means for developing a luminance signal level and a chroma amplifying means for developing a chroma signal level, circuit means for causing the luminance and chroma signal levels to track, comprising:

a potentiometer having a single wiper contact movable across a resistance element between a pair of end contacts;

contrast means AC coupling said potentiometer to said luminance amplifying means for varying the AC degeneration of said luminance amplifying means in response to movement of said single wiper; and chroma means DC coupling said potentiometer to said chroma amplifying means for varying the gain of said chroma amplifying means in response to movement of said single wiper.

7. The circuit means of claim 6 wherein said contrast means AC couples one of said potentiometer contacts to said luminance amplifying means, said chroma means DC couples another of said potentiometer contacts to said chroma amplifying means, and reference means coupling the remaining of said potentiometer contacts to a circuit common to said luminance amplifying means and said chroma amplifying means.

8. The circuit means of claim 7 wherein said reference means DC couples said remaining contact to said common circuit, whereby said potentiometer controls the AC gain of said luminance amplifying means and the gain of said chroma amplifying means.

9. The circuit means of claim 8 wherein said chroma means includes adjustable resistor means connected in a biasing circuit with said chroma amplifying means to control the gain of said chroma amplifying means, said adjustable resistor means providing an independent chroma control for adjusting the chroma signal level without adjusting the luminance signal level.

* * * * *